US 6,719,938 B2

(12) United States Patent
Summerer

(10) Patent No.: US 6,719,938 B2
(45) Date of Patent: Apr. 13, 2004

(54) INJECTION MOLDING METHOD AND APPARATUS FOR UNDERLAYING A TOP MATERIALS WITH PLASTIC

(76) Inventor: Franz Josef Summerer, Gänsbach 33 II, D-83253 Rimsting (DE)

( * ) Notice: Subject to any disclaimer, the term of this patent is extended or adjusted under 35 U.S.C. 154(b) by 132 days.

(21) Appl. No.: 09/906,572

(22) Filed: Jul. 16, 2001

(65) Prior Publication Data

US 2002/0044984 A1 Apr. 18, 2002

Related U.S. Application Data

(63) Continuation of application No. PCT/DE00/00062, filed on Jan. 8, 2000.

(30) Foreign Application Priority Data

Jan. 28, 1999 (DE) .......................................... 199 03 338

(51) Int. Cl.[7] .............................................. B29C 45/16
(52) U.S. Cl. .................... 264/241; 264/255; 425/111; 425/116; 425/117; 425/125; 425/129.1
(58) Field of Search .............................. 425/116, 127, 425/129.1, 130, 111, 117, 120, 125, 292; 264/328.7, 241, 255

(56) References Cited

U.S. PATENT DOCUMENTS 4,692,108 A * 9/1987 Cesano ....................... 425/292

FOREIGN PATENT DOCUMENTS

| DE | 41 10 445 C2 | 3/1991 |
| GB | 2 195 940 A | 4/1988 |
| WO | WO 97/06939 | 2/1997 |

* cited by examiner

Primary Examiner—Tim Heitbrink
(74) Attorney, Agent, or Firm—Hamilton, Brook, Smith & Reynolds, P.C.

(57) ABSTRACT

An injection molding apparatus for underlaying a flexible top material with plastic inside a cavity, which is formed between a female mold core plate and a mold core, with a dipping edge on the female mold side and another dipping edge on the mold core side, which bound a dipping edge gap that adjoins the cavity, into which gap the top material situated in the cavity extends. The dipping edge on the female mold side is formed on a dipping edge slider that is movably mounted on the female mold plate.

26 Claims, 4 Drawing Sheets

INJECTION MOLDING METHOD AND APPARATUS FOR UNDERLAYING A TOP MATERIALS WITH PLASTIC

RELATED APPLICATIONS

This application is a continuation of International Application No. PCT/DE00/00062, which designated the United States and was filed on Jan. 8, 2000, published in German, and which claims priority to German Application 199 03 338.2, filed Jan. 28, 1999. The entire teachings of the above applications are incorporated herein by reference.

BACKGROUND OF THE INVENTION

It is known that top materials such as fabric, leather, a film, or the like, can be underlaid with plastic so that a double layer molded part of a composite material results. Such composite molded parts have manifold applications, for example in the automobile industry as inside door linings, roof linings, auto seat parts, or the like.

Underlaying with plastic has the advantage that the flexible top material is solidly joined to a form-stable support material, so that it can easily be fastened to a substructure. Separate stretching and gluing of the top material to a support material is thus obviated. Underlaid composite parts thus make possible rapid, simple, economical, and qualitatively high grade production. Furthermore, no adhesive needs to be used, so that unpleasant, often hazardous vapors also are avoided.

When underlaying the often sensitive top materials, care must be taken not to damage them. For this purpose, the plastic is injected at the lowest possible pressure into the mold cavity, in which the top material is already situated. The injected plastic here presses the top material against the cavity wall. Injecting at a low pressure is made possible in that the injection molding tool at first is not completely closed, but remains slightly open, for example, 2 to 10 mm. To prevent plastic injected in this position from exiting beyond the edge of the cavity, known injection molding tools have a female mold plate with a so-called dipping edge, i.e., an extension of that wall of the female form plate which bounds the cavity. In known injection molding tools, this dipping edge is a fixed part of the female mold plate. Together with an oppositely situated dipping edge of the mold core, it forms a dipping edge gap, which can be slightly tapered, for example, at an angle of 5°. The top material, which has been inserted into the cavity before the underlaying process, also extends into the dipping edge gap. When the injection molding tool is completely closed, which is done while the plastic is being injected, it is clamped into the dipping edge gap.

SUMMARY OF THE INVENTION

A disadvantage of the known apparatuses is that, when the dipping edge of the female mold wears out—and it wears out considerably due to the relatively high stress—the entire female mold plate must be replaced or refurbished. Furthermore, it is not possible to change the size of the dipping edge gap, which would be desirable for various reasons, for example for different top materials.

Thus, an injection molding apparatus is provided which makes it possible to underlay top material with minimal apparative and operational complexity, and which can operate in a qualitatively especially high grade manner.

In one embodiment of the inventive injection molding apparatus, the dipping edge of the female mold is formed at a dipping edge slider which is movably mounted on the female mold plate.

The inventive dipping edge slider has the advantage that it can be replaced when it wears out, without needing to replace the entire female mold plate or having to refurbish the contour regions of the cavity. This saves considerable costs and time. Furthermore, by appropriately positioning the dipping edge slider, it is possible to change the size of the dipping edge gap and to adjust it optimally for the top material. In this way, the measure by which the top material is pressed together when the injection molding tool is completely closed can be finely regulated. Distortion and ugly markings caused by over stretching the top material likewise can be avoided, since the dipping edge gap can be enlarged somewhat as necessary. Furthermore, it is possible to adjust the dipping edge slider in such a way that, when the injection molding tool is completely closed, a very slight amount of plastic can still exit from the cavity into the dipping edge gap. This creates a stiff separation point, which later makes it possible to separate the top material easily at this point.

According to an advantageous modification, the dipping edge on the mold core side is formed on a separation slider that is movably guided in the mold core. The sides with the dipping edge gap can also be appropriately adjusted and changed by means of such a separation slider. Appropriate gap dimension adjustment elements can be used for this purpose as may be necessary. Furthermore, the separate separation slider has the advantage that it can be replaced in case of wear, without needing to replace or refurbish the above mold core plate or the mold core.

It is especially advantageous for the separation slider to have a cutting edge to cut off the top material at the end of the cavity. With this modification, the separation slider, which bounds the dipping edge gap, is simultaneously used to cut off the top material at the end of the cavity after the underlaying process. During the injection molding process, the separation slider functions to bound the cavity along its edge, so as to prevent the plastic from undesirably exiting there. The separation slider can be moved, so as to accomplish the cutting process, while the injection molding tool is closed, immediately after the injection process, as soon as the plastic has appropriately solidified. Thus, it is no longer necessary to cut off the excess top material at the edge by a separate cutting process. This results in a considerable saving of time. Furthermore, it also is not necessary to provide separate cutting devices. Also, the cutting process does not involve any risk that other gated parts, for example, rubber sealing lips, are damaged.

A supplementary cavity advantageously is formed at that side of the separation slider which faces the cavity. This can be displaced by moving the separation slider between a position offset relative to the cavity and one which joins with the cavity. This supplementary cavity can be used for gating another part, for example, a rubber sealing lip, to the underlaid molded part. This gating process suitably occurs after the underlaying process in the cavity, as soon as the plastic has solidified far enough so that the separation slider, which bounds the cavity at its edge, can be moved. The gated part in this way is joined solidly to the underlaid plastic. In this way, subsequent melting of the part is obviated. A special advantage here is that two working steps can be performed by means of a single stroke motion, namely the cutting of the top material and the opening of the supplementary cavity for gating another part. The cycle time is correspondingly reduced.

According to an advantageous design, the dipping edge slider is pretensioned in its stop position by a spring force or pneumatically. When the separation slider is pulled back, the top material therefore is at first clamped in more strongly, until the spring force of the dipping edge slider has been overcome. This clamping process fixes the top material perfectly, which aids a clean and defined cut.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
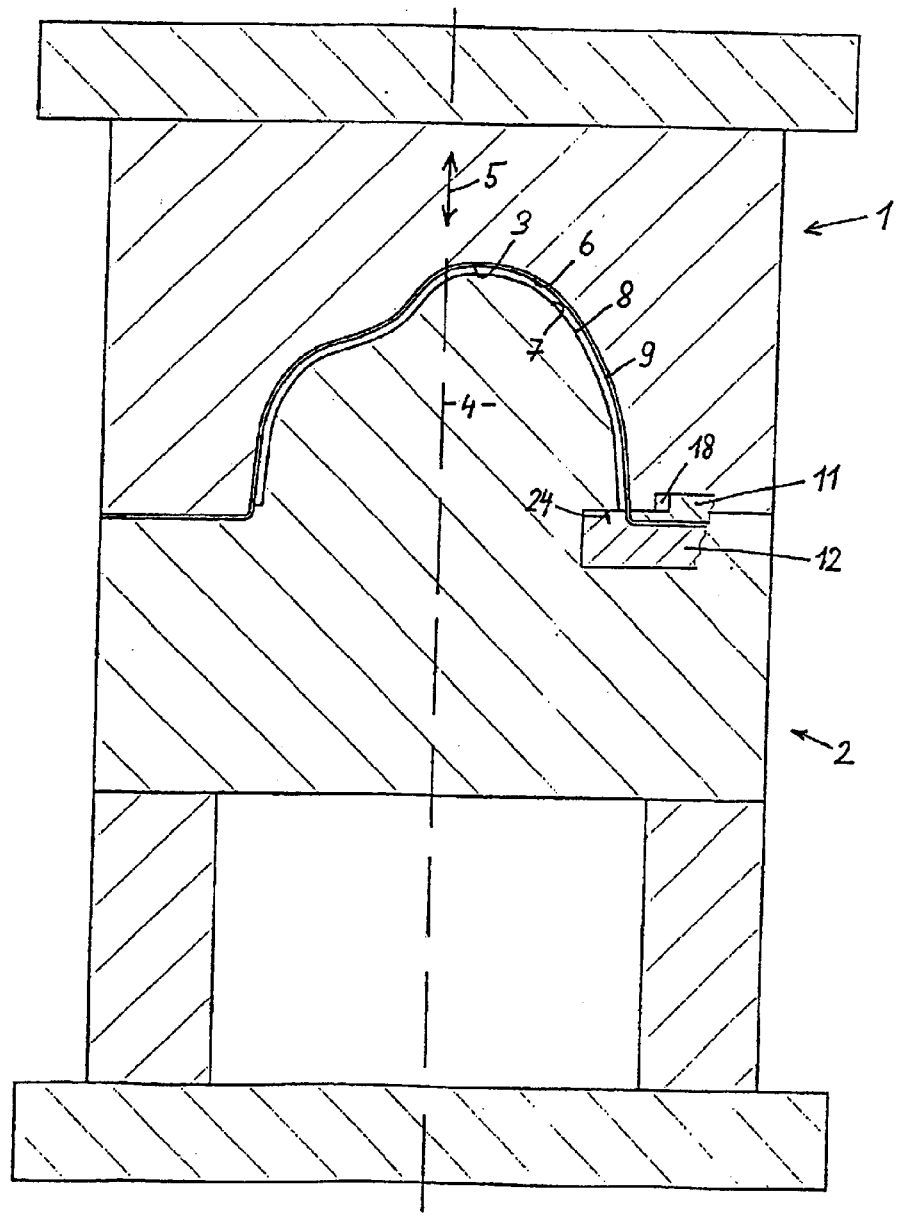
FIG. 1 shows in the right half a schematic, partly exploded view of the inventive injection molding apparatus in its closed state, while the left half shows the prior art.
Figure 2:
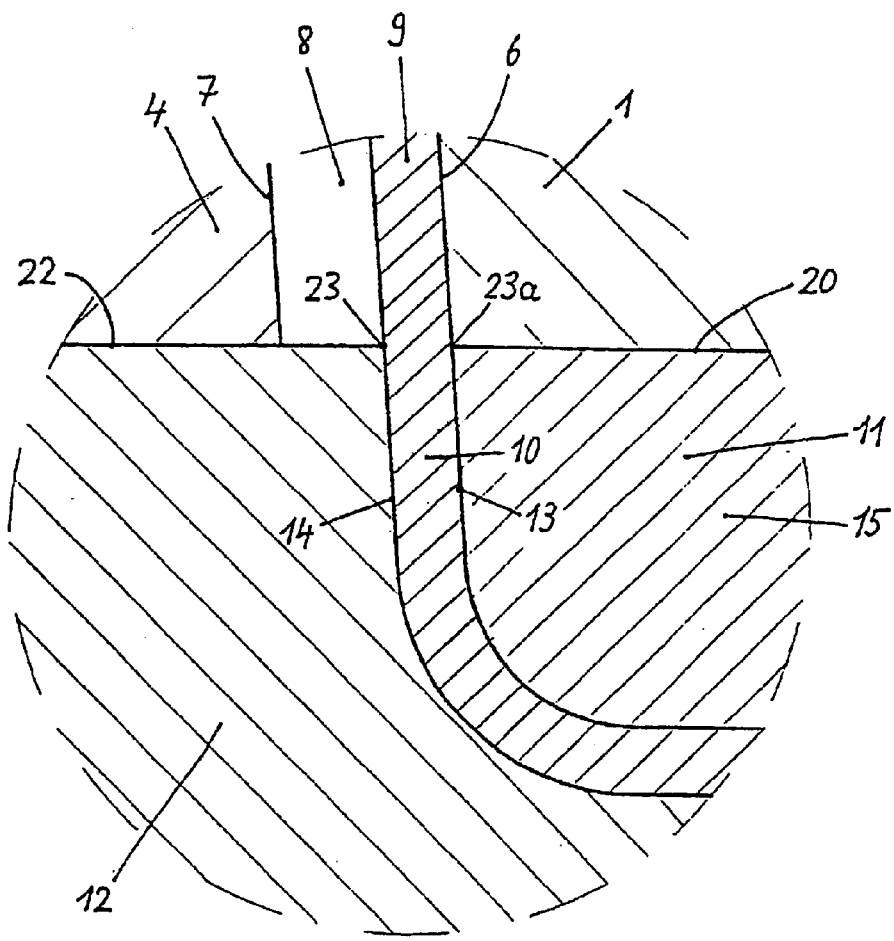
FIG. 2 shows an enlarged detail section of the inventive injection molding apparatus of FIG. 1, in the region of the dipping edge gap.
Figure 3:
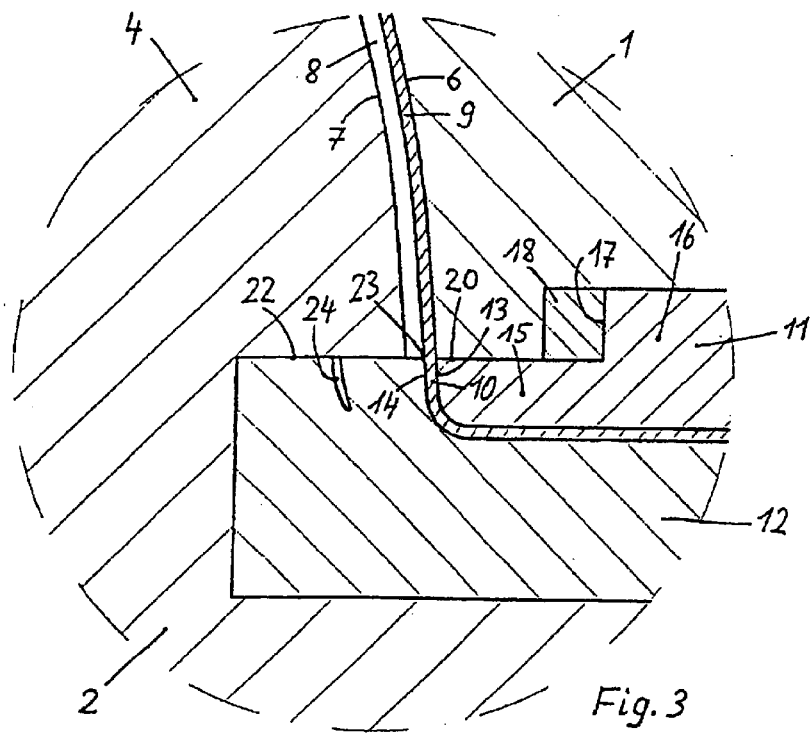
FIG. 3 shows an enlarged detail representation of the injection molding apparatus of FIG. 1, with the dipping edge slider and the separation slider situated in their run-in position, which they assume during the underlaying process.

A description of preferred embodiments of the invention follows. As FIG. 1 shows, the inventive injection molding apparatus has a female mold plate 1 and a mold core plate 2. A recess 3 with a certain three-dimensional shape is present in the female mold plate 1. The mold core plate 2 has a mold core 4 at its front end. The outer shape of this mold core matches the shape of the recess 3. By moving the female mold plate 1 relative to the mold core plate 2, in the direction of the arrow 5, the mold core 4 is brought into or removed from the recess 3.

Even in the completely closed state shown in FIG. 1, the bounding wall 6 of the recess 3 has a certain distance from the outer bounding wall 7 of the mold core 4, thus forming a cavity 8. The shape of the cavity 8 determines the shape of the end process that will be produced by means of the underlaying process.

Figure 5:
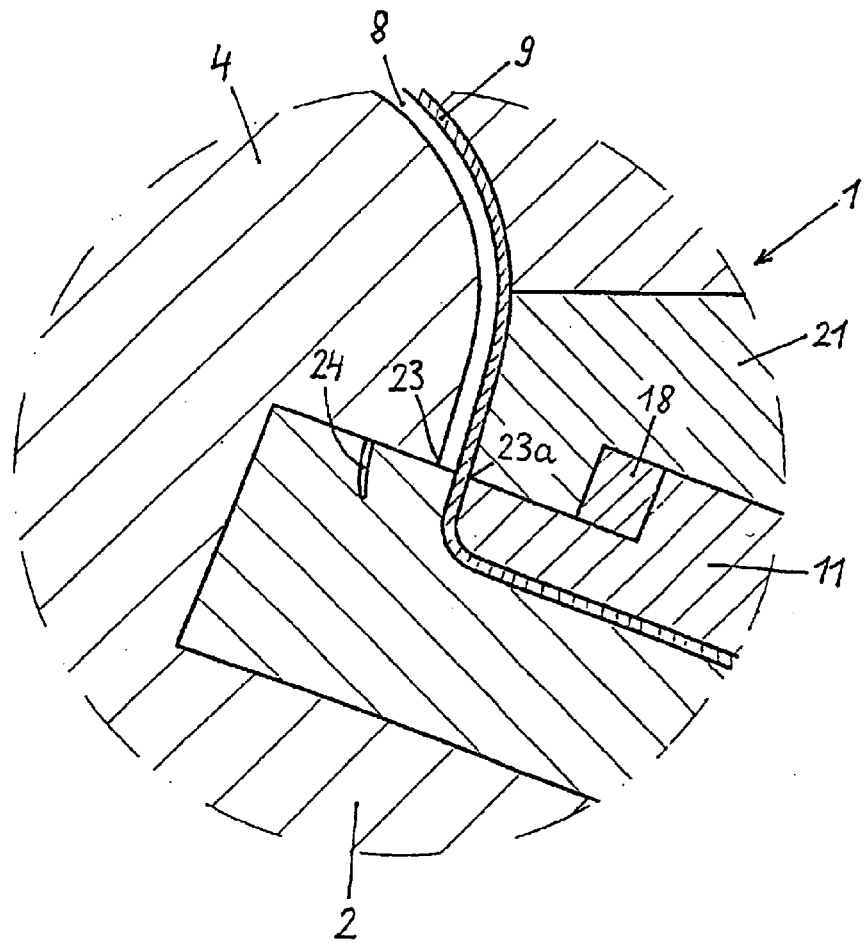
FIG. 5 shows a representation in accordance with FIG. 3, with the dipping edge slider being movably mounted on a contour slider.

A flexible top material 9, for example fabric, leather, or film, is situated in the cavity 8. This top material 9 adjoins the bounding wall 6 on the female side and extends beyond the edge area of the cavity 8 into a dipping edge gap 10. With the inventive apparatus, this dipping edge gap 10 is bounded by a dipping edge slider 11, movably mounted on the female mold plate 1, and by a separation slider 12, movably mounted on the mold core plate 2. Alternatively, it is also possible to movably mount the dipping edge slider 11 on a contour slider 21, as shown in FIG. 5. The contour slider 21 on its part is movably mounted on the female mold plate 1 and bounds the cavity 8 on the female mold side in the underlaid regions.

As can be seen from FIGS. 1 to 4, the dipping edge gap 10 at first continues in a straight line in the region which adjoins the cavity 8, and then bends laterally outward at an angle of about 100°. The bounding wall of the dipping edge slider 11, which linearly adjoins the bounding wall of the recess 3 and which extends approximately to the bend of the dipping edge gap 10 is called the dipping edge 13 on the female mold side. The bounding wall of the separation slider 12, which is situated opposite the dipping edge 13 on the female mold side is called the dipping edge 14 on the mold core side. The dipping edges 13, 14 can run slightly tapered with respect to one another, and can assume an angle which opens toward the top, for example an angle of 5°. The distance of the dipping edges 13, 14 from one another, i.e., the size of the dipping edge gap, in the closed state of the injection molding apparatus is less than the thickness of the top material 9, so that the top material 9 is pressed together in the dipping edge gap 10 during the underlaying process. As a result, the top material 9 is fixed and at the same time plastic is prevented from exiting from the cavity into the dipping edge gap 10.

Figure 4:
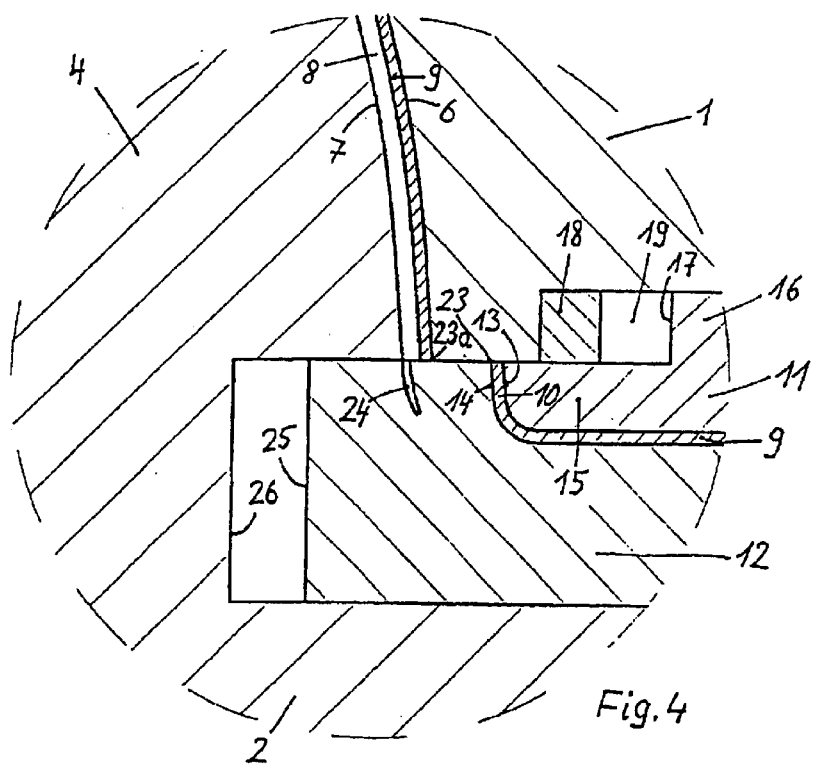
FIG. 4 shows a representation in accordance with FIG. 3, with the dipping edge slider and the separation slider in their withdrawn separation and gating position.

The dipping edge slider 11 is fastened to the female mold plate 1 so that it can move transversely. The dipping edge slider 11 thus can be moved laterally outward, from the position shown in FIGS. 1 to 3, in which the dipping edge 13 is flush with the bounding wall 6 of the recess 3, as shown in FIG. 4. Furthermore, the dipping edge slider 11 is formed in such a way that it has a narrower, front dipping edge section 15 and a broader rear section 16. A shoulder 17 is thus formed between the sections 15, 16, which serves as a stop to bound the inward path of motion of the dipping edge slider 11. The shoulder 17 interacts with an element 18 which adjusts the gap size and which serves as a counter-stop and is fixed in a takeup space 19 of the female mold plate 1. The upper bounding wall 20 of the dipping edge slider 11, adjoining the female mold plate 1, is situated in the frontal bounding plane of the cavity 8 when the injection molding apparatus is in its closed state.

The inward motion of the separation slider 12 can be bounded, for example, in that the front face 25 of the separation slider 12 strikes against a frontal stop 26 of the mold core plate 2 or of the mold core 4. Adjustment elements (not shown) similar to the element 18 for adjusting the gap size, can be present between the separation slider 12 and the frontal stop 26. Furthermore, it is also readily possible for the separation slider 12 and the mold core plate 2 or the mold core 4 to have similar protruding shoulders as the dipping edge slider 11 and the female mold plate 1, which serve as stops for determining the inward path of motion of the separation slider 12 and thus also to adjust the size of the dipping edge gap.

The separation slider 12, mounted on the mold core plate 2, can be moved similarly and in the same direction as the dipping edge slider 11. For this, the separation slider 12 has an upper bounding wall 22, which is flush with the upper bounding wall 20 of the dipping edge slider 11. The transition point between the dipping edge 14 on the mold core side and the upper bounding wall 22 is designed as a sharp cutting edge 23. If the separation slider 12, together with the dipping edge slider 11, is moved laterally outward after the underlaying process, as shown in FIG. 4, the cutting edge 23 cuts the top material 9 at the transition point between the cavity 8 and the dipping edge gap 10. The cutting edge 23 here interacts with a cutting edge 23a of the female mold plate 1. In the embodiment shown, the direction of motion of the separation slider 12 runs at an angle of about 100° transverse to the top material 9.

Furthermore, a supplementary cavity 24 can be present in the separation slider 12. It extends from the upper bounding wall 22 into the separation slider 12. This supplementary cavity 24 serves to gate an additional element, for example a rubber sealing lip, to the finish underlaid plastic part, which is situated in the cavity 8.

The production of an underlaid product by means of the inventive injection molding apparatus will be explained in more detail below.

When the injection molding apparatus is open, the mold core 4 initially is situated outside the recess 3 on the female mold side. The dipping edge slider 11 and the separation slider 12 are situated in their inner position, i.e., quite to the left in the embodiment shown here.

The top material 9 is now placed into the recess 3, and the edge areas of the top material 9 are pulled over the dipping edge 13 on the female mold side, and are fixed further out, for example by means of pins. The female mold plate 1 is then moved in the direction of the mold core plate 2, so that the mold core 4 engages the recess 3.

At first, the injection molding apparatus is not yet completely closed, but initially still remains open a few millimeters. Since the size of the gap within the cavity 8 thus is still relatively large, the plastic can be injected at a relatively low pressure into the cavity, so as to treat the top material 9 gently. The plastic is here conducted through an injection nozzle (not shown) inside the mold core 4. The injected plastic presses a top material 9 against the bounding wall 6 on the female mold side, and is distributed from a central region outward to the edge regions of the cavity 8. When the injection molding apparatus is initially in a still slightly open state, the upper bounding wall 22 of the separation slider 12 and the dipping edge 14 on the mold core side are already situated near the dipping edge 13 of the dipping edge slider 11, situated near the female mold side, so that undesirable exiting of plastic in this region is prevented.

During the underlaying process, when the plastic is solidly joined to the top material 9, the injection molding apparatus is completely closed, so that it assumes the position shown in FIG. 1. The top material 9 is now pressed together somewhat in the dipping edge gap 10. The region of the upper separation slider bounding wall 22, which adjoins the dipping edge gap 10, bounds the cavity 8 on its edge.

After the underlaying process has been completed, and after the plastic material has solidified to a certain extent, the separation slider 12, together with the dipping edge slider 11, is now pulled laterally outward, as shown in FIG. 4. Here, the cutting edge 23 cuts off the top material 9. The separation slider 12 is moved so far that the supplementary cavity 24 below the cavity 8 lies in that region in which the underlaid plastic is situated. Now another material, for example rubber, is injected into the supplementary cavity 24. Here, the plastic material in the edge region is partly melted, so that the rubber material can join solidly to the plastic. Then the injection molding apparatus is opened completely, and the finished end product is removed from the mold core 4 by a demolding device.

While this invention has been particularly shown and described with references to preferred embodiments thereof, it will be understood by those skilled in the art that various changes in form and details may be made therein without departing from the scope of the invention encompassed by the appended claims.

What is claimed is:

1. An injection molding apparatus for underlaying a flexible top material with plastic to be injected inside a cavity, which is formed between a female mold core plate and a mold core, with a dipping edge on the female mold side and another dipping edge on the mold core side, which bound a dipping edge gap that adjoins the cavity, into which gap the top material situated in the cavity extends, the dipping edge on the female mold side being formed on a dipping edge slider that is movably mounted on the female mold plate.

2. The injection molding apparatus of claim 1, wherein the dipping edge slider has a stop which interacts with a counter-stop formed on the female mold plate to bound the path of motion.

3. The injection molding apparatus of claim 2, further comprising at least one element for adjusting the gap size, the at least one element being situated between the stop of the dipping edge slider and the counter-stop of the female mold plate.

4. The injection molding apparatus of claim 1, wherein the dipping edge at the mold core side is formed on a separation slider which is movably guided on the mold core plate.

5. The injection molding apparatus of claim 4, wherein the separation slider has a stop which interacts with a counter-stop formed on the mold core plate or on the mold core to limit the path of motion.

6. The injection molding apparatus of claim 5, further comprising at least one element to adjust the gap size, the at least one element being situated between the stop of the separation slider and the counter-stop of the mold core plate or of the mold core.

7. The injection molding apparatus of claim 4, wherein the separation slider has a cutting edge to cut off the top material at an end of the cavity.

8. The injection molding apparatus of claim 4, wherein a supplementary cavity is formed on that side of the separation slider which faces the cavity, such that the supplementary cavity can be moved between a position displaced relative to the cavity and a position adjoining the cavity, by moving the separation slider.

9. The injection molding apparatus of claim 2, wherein the dipping edge slider is pre-tensioned in its stop position.

10. The injection molding apparatus of claim 9, wherein the dipping edge slider is pre-tensioned in its stop position with a spring.

11. The injection molding apparatus of claim 9, wherein the dipping edge slider is pneumatically pre-tensioned in its stop position.

12. The injection molding apparatus of claim 1, wherein the dipping edge slider is movably mounted on a contour slider of the female mold core plate.

13. The injection molding apparatus of claim 1, wherein the top material includes at least one of fabric, leather, or film.

14. An injection molding apparatus for underlaying a flexible top material with plastic to be injected inside a cavity which is formed between a female mold core plate and a mold core, comprising:
   a dipping edge slider being movable with respect to the female mold core plate, the slider including a first dipping edge; and
   a second dipping edge being formed on a separation slider, the first dipping edge and the second dipping edge forming a dipping edge gap that adjoins the cavity into which gap the top material extends.

15. The injection molding apparatus of claim 14, wherein the separation slider has a cutting edge to cut off the top material at an end of the cavity.

16. The injection molding apparatus of claim 14, wherein a supplementary cavity is formed on that side of the separation slider which faces the cavity, such that the supplementary cavity can be moved between a position displaced relative to the cavity and a position adjoining the cavity, by moving the separation slider.

17. The injection molding apparatus of claim 14, wherein the dipping edge slider is movably mounted on a contour slider of the female mold core plate.

18. A method for producing a composite material such that a flexible top material is underlaid with plastic in a cavity, which is formed between a female mold plate and a mold core, such that the top material extends into a dipping edge gap adjoining the cavity, the gap being bounded by a dipping edge on the female mold side and by a dipping edge on the core mold side, wherein a separation slider, on which the dipping edge on the mold core side is formed, together with a dipping edge slider, on which is formed the dipping edge on the female mold side, are moved, after the top material has been underlaid, in such a way that another plastic component can be injected into a supplementary cavity.

19. A method for producing a composite material such that a flexible top material is underlaid with plastic in a cavity, which is formed between a female mold plate and a mold core, such that the top material extends into a dipping edge gap adjoining the cavity, the gap being bounded by a dipping edge on the female mold side and a dipping edge on the core mold side, wherein a separation slider, on which the dipping edge on the mold core side is formed and which has a cutting edge, together with a dipping edge slider, on which the dipping edge on the female mold side is formed, after the top material has been underlaid, are moved in such a way that the top material is cut off at the end of the cavity.

20. The method of claim 19, further comprising the step of adjusting the size of the gap.

21. A method for underlaying a flexible top material with plastic inside a cavity which is formed between a female mold core plate and a mold core, comprising:

providing a dipping edge slider that is movable with respect to the female mold core plate, the slider including a first dipping edge; and forming a second dipping edge on a separation slider, the first dipping edge and the second dipping edge forming a dipping edge gap that adjoins the cavity into which gap the top material extends.

22. The method of claim 21, further comprising moving the dipping edge slider and the separation slider to cut off the top material that extends into the diving edge gap.

23. The method of claim 21, further comprising the step of adjusting the size of the gap.

24. An injection molding apparatus for underlaying a flexible top material with plastic to be injected inside a cavity, which is formed between a female mold core plate and a mold core, with a dipping edge on the female mold side and another dipping edge on the mold core side, which bound a dipping edge gap that adjoins the cavity, into which gap the top material situated in the cavity extends, the dipping edge on the female mold side being formed on a dipping edge slider that is movably mounted on the female mold plate, the dipping edge slider having a stop which interacts with a counter-stop formed on the female mold plate to bound the path of motion, the apparatus also including at least one element for adjusting the gap size, the at least one element being situated between the stop of the dipping edge slider and the counter-stop of the female mold plate.

25. An injection molding apparatus for underlaying a flexible top material with plastic to be injected inside a cavity, which is formed between a female mold core plate and a mold core, with a dipping edge on the female mold side and another dipping edge on the mold core side, which bound a dipping edge gap that adjoins the cavity, into which gap the top material situated in the cavity extends, the dipping edge on the female mold side being formed on a dipping edge slider that is movably mounted on the female mold plate, the dipping edge at the mold core side being formed on a separation slider which is movably guided on the mold core plate.

26. An injection molding apparatus for underlaying a flexible top material with plastic to be injected inside a cavity, which is formed between a female mold core plate and a mold core, with a dipping edge on the female mold side and another dipping edge on the mold core side, which bound a dipping edge gap that adjoins the cavity, into which gap the top material situated in the cavity extends, the dipping edge on the female mold side being formed on a dipping edge slider that is movably mounted on the female mold plate, the dipping edge slider having a stop which interacts with a counter-stop formed on the female mold plate to bound the path of motion, the dipping edge slider being pre-tensioned in its stop position.

* * * * *